Feb. 19, 1929. C. F. JENKINS Re. 17,221
SYNCHRONISM IN RADIO MOVIES
Filed May 21, 1927
Original Filed May 21, 1927
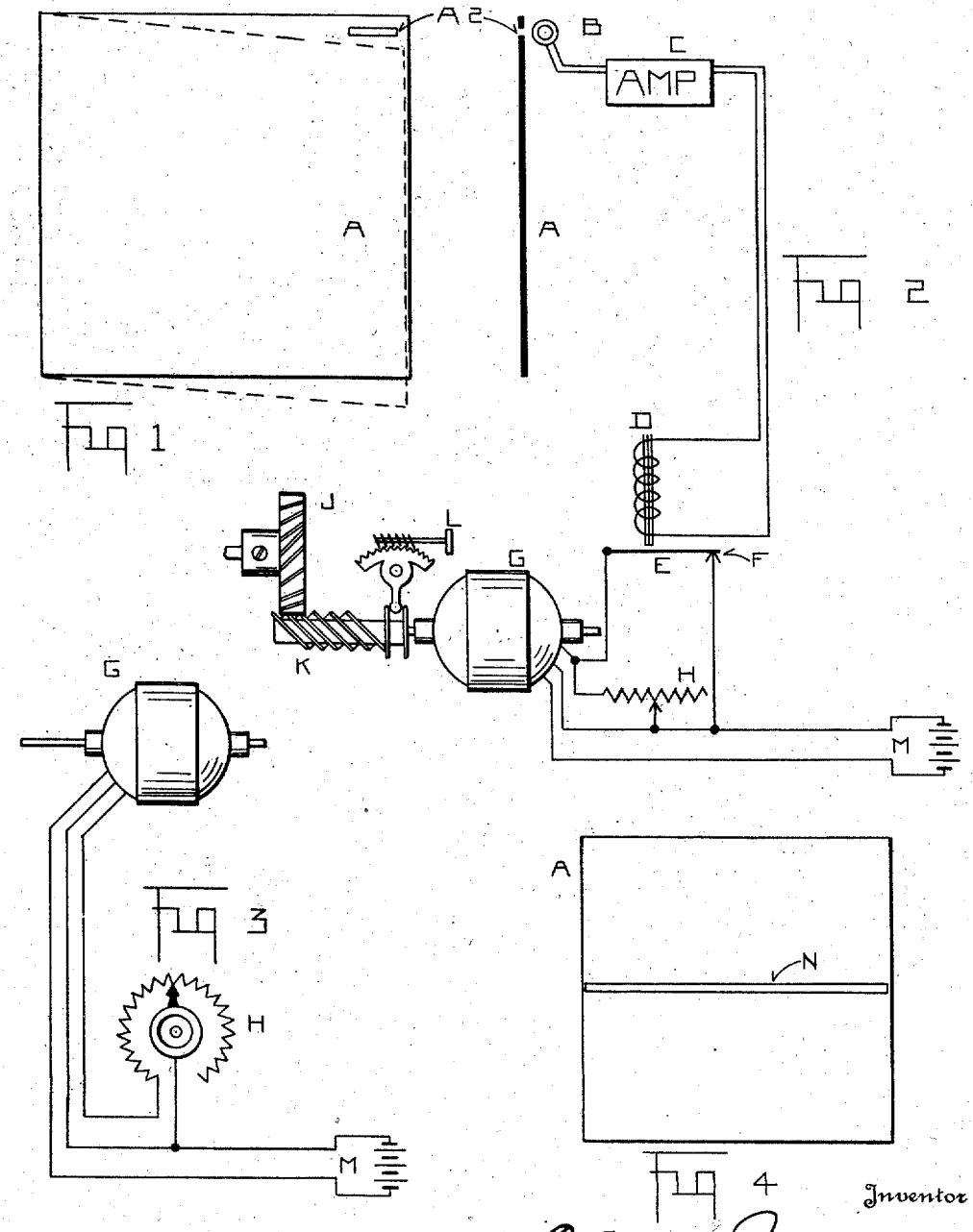
Inventor
C. Francis Jenkins
By
Sybil F. Almand
Attorney Reissued Feb. 19, 1929. Re. 17,221

UNITED STATES PATENT OFFICE.

CHARLES FRANCIS JENKINS, OF WASHINGTON, DISTRICT OF COLUMBIA, ASSIGNOR TO JENKINS LABORATORIES, OF WASHINGTON, DISTRICT OF COLUMBIA, A CORPORATION OF DISTRICT OF COLUMBIA.

SYNCHRONISM IN RADIO MOVIES.

Original No. 1,660,711, dated February 28, 1928, Serial No. 193,259, filed May 21, 1927. Application for reissue filed December 8, 1928, Serial No. 324,785.

This invention relates to methods of synchronizing distantly-separated motors, with particular reference to the motors driving mechanisms used in the transmission and reception of radio vision and television.

Heretofore the method most frequently employed in the control of the speed of the several motors has been by the beat of tuning forks. Another method is the direct coupling of the transmitting and receiving motors to the same source of power with synchronous motors either directly or with amplified synchronous impulses. But when great distances separate the receivers from the transmitter neither of these methods are acceptable for radio movies and radio vision.

The herein-described method consists in maintaining synchronism by the symmetry of the picture itself, or reattaining it by the asymmetry of the picture.

In the drawings, Fig. 1 is a front view of the screen upon which the radio movies are projected; Fig. 2 an edge-view of the screen, and a schematic drawing of the mechanism for automatically attaining synchronism, and for shifting the picture on the screen; Fig. 3 mechanism for manually attaining synchronism; and Fig. 4 another view of the picture screen, in reduced scale.

In the several figures, A is a picture screen; B a light-sensitive cell; C an amplifier connected thereto; D the electro-magnet of a relay; E the armature of this relay; F a contact on the armature; G a motor; H a rheostat in one of the circuits of the motor (the armature circuit, in the hereinafter description); J a spiral gear driven by the gear K on the shaft of the motor, and L a hand wheel for shifting the motor gear along the squared shaft of the motor. M is a source of current for the motor; and N a "frame line" between the upper half of one picture frame and the lower half of the adjacent picture frame in the picture being projected on the screen.

This invention relates only to the synchronous control of the motors, which may be the motors used in radio movies and radio vision, and as the scanning mechanism is no part of the invention, it is not here illustrated—any scanning mechanism will answer.

When a motion picture first appears on the screen it is not usual to find it "framed"; it is more likely to be out of frame with a frame line appearing across the screen (as at N in Fig. 4), straight or askew. The framing of the picture is then attained by shifting the rotative relation of the receiving mechanism with respect to the rotation of the transmitting mechanism;—not by a change of speed of the motors, but the rotative relation of the motors.

This framing of the picture, i. e., the shifting of the rotative relation of the receiver and transmitter, is attained by sliding the spiral gear K along the square shaft of the motor G. Such shifting of this gear either advances or retards the gear J which drives the scanning mechanism, and is done while it continues in motion. The framing of the picture is completed, of course, when the frame line N disappears at the top or bottom of the picture screen.

Synchronism of the motor of the receiver mechanism and the transmitting machine to square up or rectify the picture from a picture which is askew as suggested by dotted lines in Fig. 1, is attained by speeding or slowing the motor of the receiver until the picture on the screen is squared, that is, until the screen shows an acceptable picture.

This changing of the motor speed results from the rotation of the hand wheel of rheostat H, Fig. 4, to increase or decrease the resistance of the motor circuit.

In Fig. 2 mechanism is provided for automatically bringing the receiver motor into synchronism with the transmitter motor. In the corner of the picture screen an oblong aperture $A^2$ is cut. Behind this opening a light-sensitive cell is located. When a picture is projected askew on the screen (as shown by dotted lines, Fig. 1), no light passes through the aperture and the relay contact at F is closed and the rheostat H short-circuited, speeding up the motor until the picture is squared up on the screen. When this happens light passes through the aperture, activates the cell and opens the relay contact at F. This puts the resistance H into the motor circuit and the motor slow down. It has been found rather easy to so adjust the rheostat H that the motor will run in exact synchronism with the transmitter motor.

What I claim is—

1. In a device of the character described, the combination of a screen and a receiver motor, a light sensitive cell adjacent said screen energizable when a picture is projected on the screen in a framed position, and means for electrically connecting said cell and motor whereby upon energization of the cell the motor circuit is changed to reduce the speed of the motor.

2. In a device of the character described, the combination of a motor, a resistance normally short circuited with respect to said motor, a relay having a contact in circuit with the motor and normally operative to short circuit said resistance, a light sensitive cell in circuit with said motor, and means operable by energization of said cell to open said relay and place the resistance in the motor circuit to reduce the speed of the motor.

3. In a device of the character described, having receiver and transmitting motors and scanning mechanism, the combination of means for automatically changing the motor phases to synchronize the same, and manual means for changing the said phase comprising a spiral gear slidable on one of the motor shafts, a second gear adapted to operate the scanning mechanism meshing with said spiral gear, and means engaging said spiral gear and operable to slide the same on the shaft, thereby advancing or retarding the said second gear to shift the rotative relation of the motor.

In testimony whereof I have hereunto affixed my signature.

CHARLES FRANCIS JENKINS.